(12) United States Patent
Alemi

(10) Patent No.: US 11,489,419 B2
(45) Date of Patent: Nov. 1, 2022

(54) MOTOR HOUSING REMOVAL ASSEMBLY AND METHOD OF REMOVING A MOTOR HOUSING

(71) Applicant: Craig Alemi, Sarasota, FL (US)

(72) Inventor: Craig Alemi, Sarasota, FL (US)

( * ) Notice: Subject to any disclaimer, the term of this patent is extended or adjusted under 35 U.S.C. 154(b) by 158 days.

(21) Appl. No.: 16/677,854

(22) Filed: Nov. 8, 2019

(65) Prior Publication Data

US 2020/0153317 A1     May 14, 2020

Related U.S. Application Data

(60) Provisional application No. 62/757,956, filed on Nov. 9, 2018.

(51) Int. Cl.
| | |
|---|---|
| *H02K 15/00* | (2006.01) |
| *H02K 15/14* | (2006.01) |
| *B60R 1/074* | (2006.01) |
| *B60S 5/00* | (2006.01) |

(52) U.S. Cl.
CPC ......... *H02K 15/0006* (2013.01); *H02K 15/14* (2013.01); *B60R 1/074* (2013.01); *B60S 5/00* (2013.01)

(58) Field of Classification Search
CPC .......................... H02K 15/0006; H02K 15/14
See application file for complete search history.

(56) References Cited

U.S. PATENT DOCUMENTS

| | | | | |
|---|---|---|---|---|
| 4,656,715 | A * | 4/1987 | Diaz ................... | B25B 27/0064 |
| | | | | 29/259 |
| 7,322,087 | B1 * | 1/2008 | Hu ........................ | B25B 27/062 |
| | | | | 29/261 |
| 7,996,972 | B2 * | 8/2011 | Hu ........................ | B25B 27/026 |
| | | | | 29/259 |
| 2010/0154201 | A1 * | 6/2010 | Pervaiz .................. | H02K 15/16 |
| | | | | 29/598 |

FOREIGN PATENT DOCUMENTS

CN             105127737 A   * 12/2015

* cited by examiner

*Primary Examiner* — Peter Dungba Vo
*Assistant Examiner* — Jose K Abraham
(74) *Attorney, Agent, or Firm* — Barclay Damon LLP

(57) ABSTRACT

A motor housing removal assembly comprises an extension defining a plurality of surface features on at least one side, an adjustment member comprising, a support member configured to couple to and move relative to the extension, an engagement element moveably coupled to the support member and configured to engage the extension to define a locked position preventing the support member from moving relative to the extension, a base portion coupled to the support member, and a plurality of pry members each comprising a first end coupled to the base and comprising a first thickness, and a second end opposing the first end and comprising a second thickness. A holder is fixedly coupled to an end of the extension and configured to hold at least a portion of a motor housing.

15 Claims, 12 Drawing Sheets

MOTOR HOUSING REMOVAL ASSEMBLY AND METHOD OF REMOVING A MOTOR HOUSING

CROSS REFERENCE TO RELATED APPLICATION

This application is a non-provisional application which the benefit and priority of U.S. Provisional Patent Application No. 62/757,956, filed on Nov. 9, 2018, the entire contents of which is hereby incorporated by reference.

BACKGROUND

Many vehicles come equipped with side mirrors that rotate or fold in towards the vehicle to prevent damage to the side mirror when the vehicle is parked or to enable the vehicle to fit into tight parking spaces. In many of these vehicles, the folding mirrors actuate or move automatically with the aid of a motor surrounded by a motor housing. These motors have a tendency to malfunction during the life of the vehicle due to repeated use. In many instances, these motors can be easily repaired without the need for replacement, however there is currently no easy way to remove the housing surrounding the motor in order to repair the motor. As a result, auto repair shops simply replace the entire power folding mirror unit rather than repair the individual motor. This can increase the time it takes to complete a repair as an entire power folding mirror unit is typically not kept in stock. Moreover, replacement of the entire power folding mirror unit is much more costly than simply repairing the motor within the power folding mirror unit.

These are just some of the problems associated with the current method to repair a motor in the power folding mirror unit or a vehicle.

SUMMARY

An embodiment of a motor housing removal assembly comprises a track defining a plurality of surface features on at least one side. A first adjustment member comprises a support configured to couple to and move relative to the track and an engagement element moveably coupled to the support and configured to engage one or more of the plurality of surface features of the track to define a locked position preventing the support from moving relative to the track. The first adjustment member further comprises a base coupled to the support and a plurality of pry members each comprising a first end coupled to the base and comprising a first thickness and a second end opposing the first end and comprising a second thickness, wherein the first thickness is greater than the second thickness. A second adjustment member comprises an actuator and a driver coupled to the actuator at one end and to the base at an opposing end, wherein movement of the actuator is configured to move the base relative to the support. A holder is fixedly coupled to an end of the track and holder comprises a first surface extending along a first plane, and a second surface spaced apart from the first surface and extending along a second plane. A gap is defined between the first and second surfaces configured to hold at least a portion of a motor housing.

In another embodiment, a motor housing removal assembly comprises an extension defining a plurality of surface features on at least one side, an adjustment member and a holder fixedly coupled to an end of the extension and configured to hold at least a portion of a motor housing. The adjustment member comprises a support member configured to couple to and move relative to the extension and an engagement element moveably coupled to the support member and configured to engage the extension to define a locked position preventing the support member from moving relative to the extension. The adjustment member further comprises a base portion coupled to the support member and a plurality of pry members each comprising a first end coupled to the base portion and comprising a first thickness and a second end opposing the first end and comprising a second thickness, wherein the first thickness is greater than the second thickness.

A method for removing a housing from a motor comprises securing a motor surrounded by a motor housing in a holder fixedly coupled to one end of an extension. An adjustment member is moved relative to the extension toward the holder to a first position, wherein a plurality of pry members positioned on the adjustment member contact at least three sides of the housing. The adjustment member is moved to a second position wherein the plurality of pry elements wedge between a first portion of the housing and second portion of the housing to separate the first portion of the housing from the second portion of the housing to expose the motor.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

The following discussion relates to various embodiments of a motor housing removal assembly and method of using the motor housing removal assembly. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "forward", "rearward", "interior", "exterior", "front", "back" and the like are not intended to limit these concepts, except where so specifically indicated. The use of the term "about" or "approximately" is meant to encompass a range of 80-120% of the disclosed value. With regard to the drawings, their purpose is to depict salient features of the inventive gun sight assembly and are not specifically provided to scale.

Figure 1:
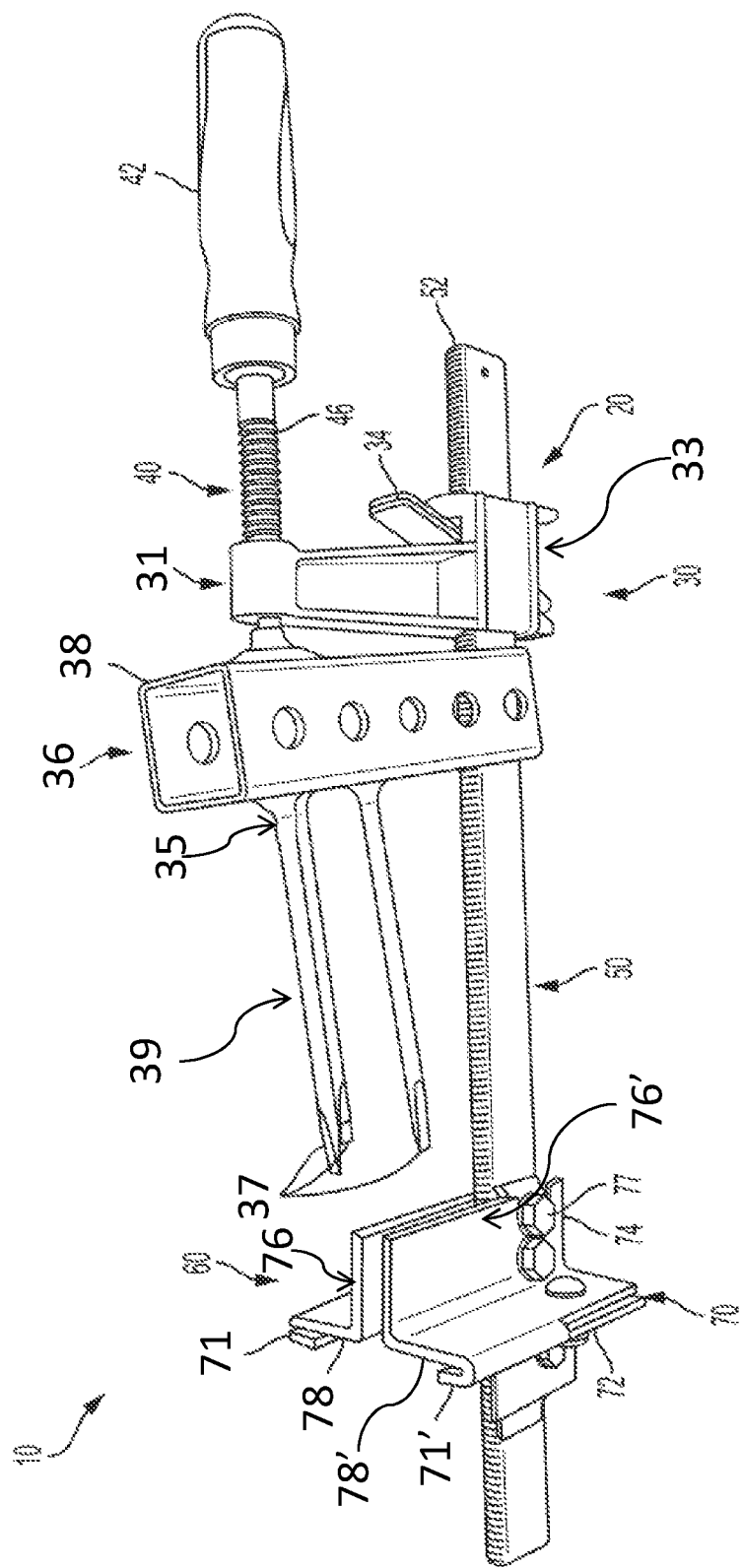
FIG. 1 illustrates a top perspective view of an embodiment of a motor housing removal assembly.
Figure 2:
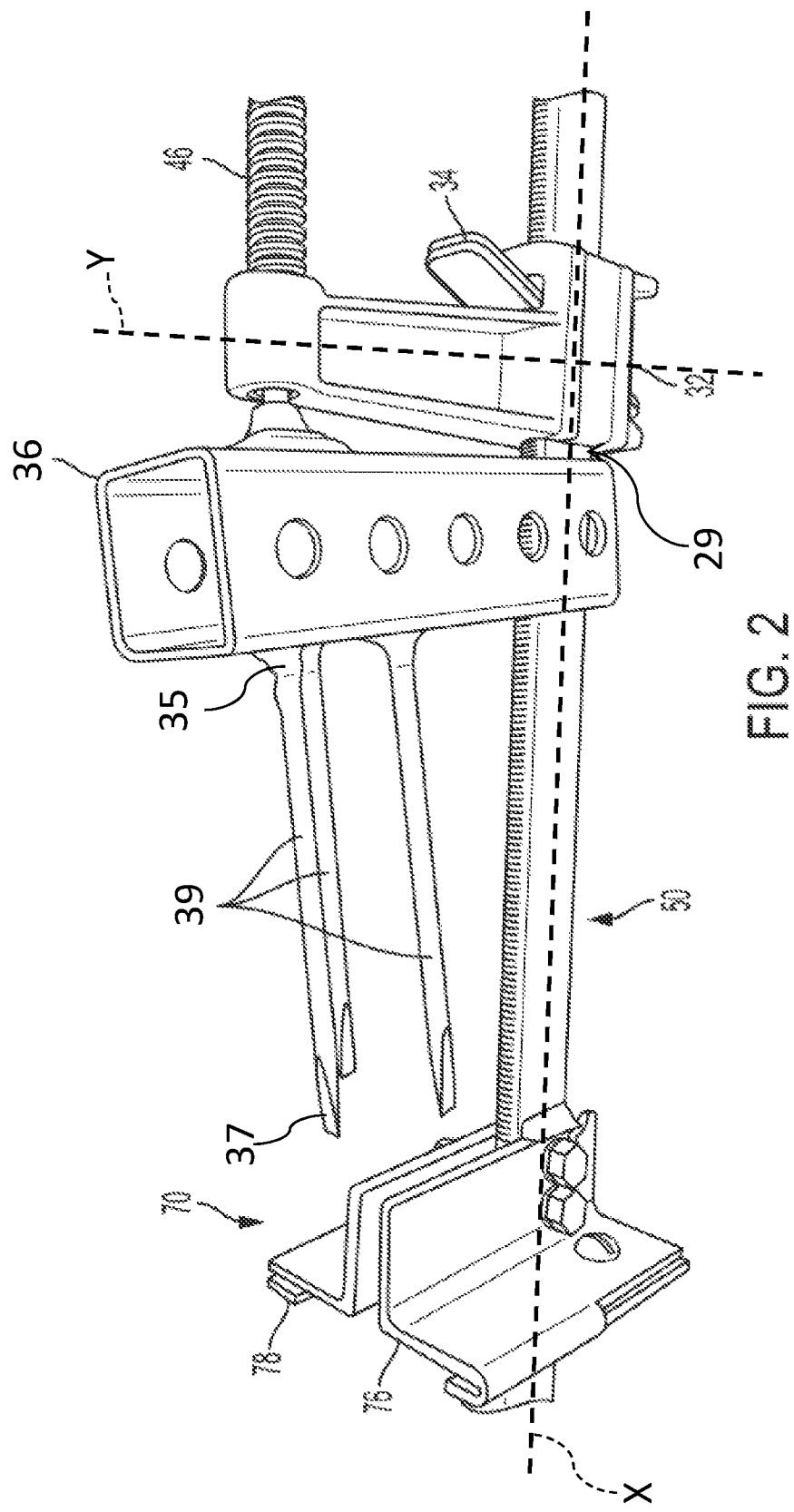
FIG. 2 illustrates a close up view of the embodiment of the motor housing removal assembly of FIG. 1.
Figure 4:
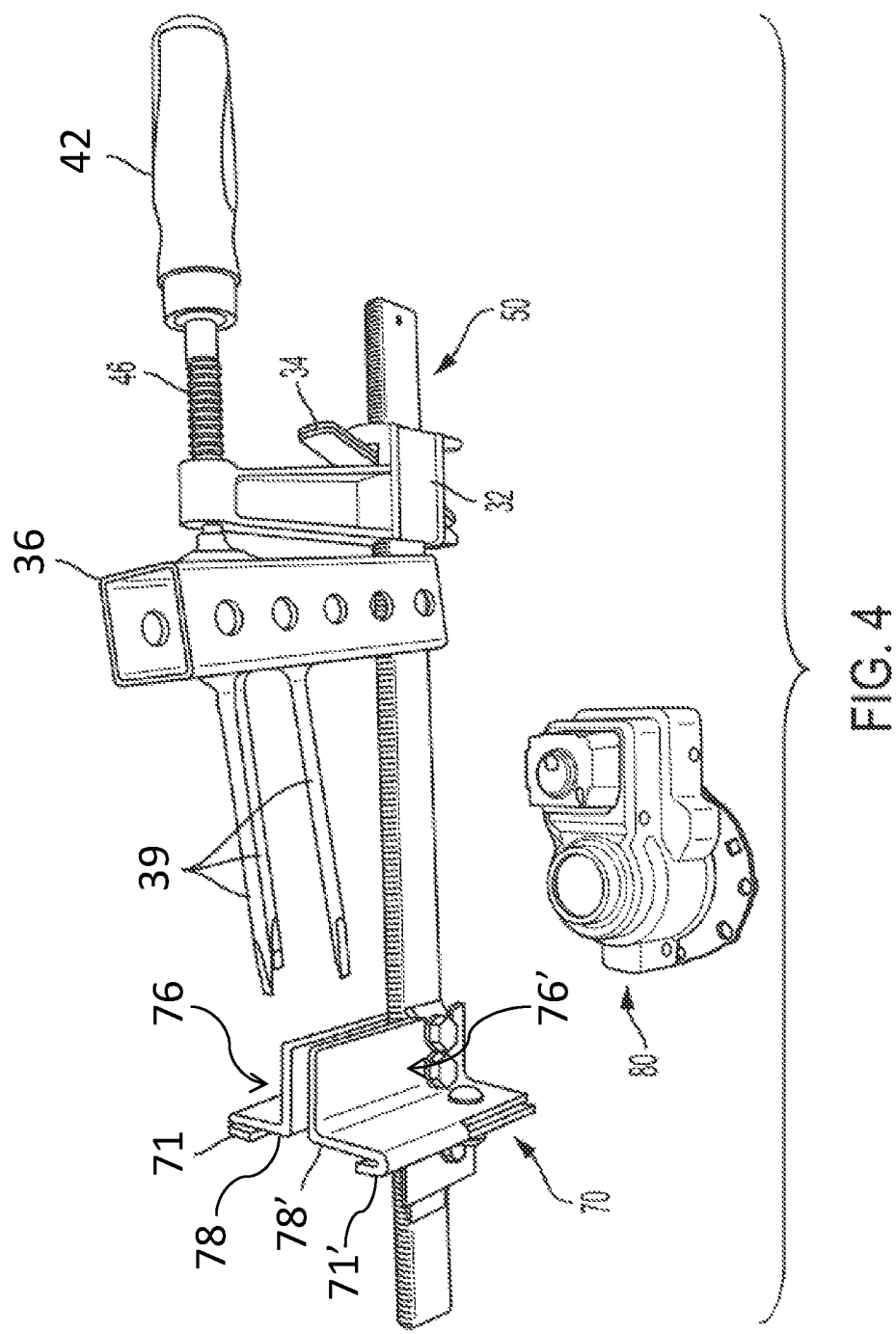
FIG. 4 illustrates a side perspective view of an embodiment of the motor housing removal assembly next to a motor that is surrounded by a motor housing.

First, and as illustrated in the embodiments of FIGS. 1, 2, and 4, the motor housing removal assembly 10 generally comprises an adjustable end 20 including an adjustable element 30. In some embodiments, the adjustable element 30 may comprise a supplemental or fine adjustment element 40. In other embodiments, the adjustable element 30 may only comprise one level of adjustment, for example as shown in the embodiment illustrated in FIG. 12. Opposite the adjustable end 20 is a fixed end 60 comprising a holder 70 that is coupled to the adjustable end 20 via a guide, an extension, or a track 50 extending from the fixed end 60. The fixed end 60 does not move relative to the track 50 and the adjustable end is capable of moving relative to the track 50.

Referring generally to FIGS. 1-4, the adjustment member 30 comprises a support member or support 32 having a first end 31 and a second end 33. As shown, the support 32 defines an opening 29 (FIG. 2) proximate the second end 33. The opening is configured to be movably coupled to or accept a portion of the track 50. As shown in FIG. 2, the support 32 generally extends along an axis Y that intersects or is roughly perpendicular the axis X of the track 50. In an embodiment not shown, the track 50 may comprise one or more guides extending along track axis X, such as a channel, ridge, or a combination thereof. The one or more guides are comprised to engage one or more complimentary guide features positioned on an interior surface of the opening 29 of the support 32. The one or more guides and the track 50 may be formed as a single unitary component and the one or more complimentary guide features may be formed as part of the support 32 such that they comprise a single unitary component. The adjustment member 30 may further comprise an engagement element 34 that is configured to be moved from a locked state, where the engagement element 34 engages the track 50 and locks the support 32 into position, to an unlocked state, where the engagement element 34 is not engaged with the track 50 and allows the support 32 to freely move relative to the track 50. In an embodiment, the engagement element 34 may be spring loaded or otherwise configured to be biased in the locked state.

As shown in the embodiments illustrated in FIGS. 1-11, at least one side of the track 50 may comprise a plurality of surface features 52 that are configured to engage one or more complimentary features or a surface of the engagement element 34. Movement of the support 32 of the adjustment member 30 may be controlled through an actuator that is manually operated or operated using an electric motor, a pneumatic assembly, or a hydraulic assembly, or any combination thereof.

The adjustment member 30 further comprises a housing engagement element 36 coupled to the support 32. The housing engagement element 36 comprises a base 38 coupled to the support 32 on a first side and coupled to a plurality of projections or prying elements 39 on an opposing second side. In an embodiment, the prying elements 39 comprise a first end 35 coupled the base 38 and having a first thickness, and an opposing second end 37 having a second thickness that is less than the first thickness. In an embodiment, at least three (3) prying elements 39 are coupled to the base 38. As shown, at least a portion of each pry element 39 comprises a circular cross-section. In an embodiment, the second end 37 of the pry elements 39 may come to a sharp point. In another embodiment, the second end 37 of the pry elements 39 may come to a flat point, such as in a flat screw driver or a tree wedge. In still another embodiment, the second ends 37 of the plurality of pry elements 39 may vary ion shape from each other. The second ends 37 of the plurality of pry elements 39 may further comprise one or more textured, coated, or otherwise treated surfaces to improve function and/or durability. In another embodiment, the pry elements 39 may be separately adjusted relative to the base 38. In an embodiment, the base 38 and the support 32 are formed as a single unitary component. however in other embodiments, the base 38 and the support 32 are separate components that are coupled together using one or more fasteners or a welded joint.

As shown generally in FIGS. 1-4, the base 38 may be movably coupled to the support 32 by a fine adjustment element 40. The fine adjustment element 40 generally comprises a handle or actuator 42 coupled to an end of a driver or shaft 46. The opposing end of the shaft 46 is coupled to the base 38 to allow for a secondary adjustment of the base 38, such that the base 38 is configured to be adjusted relative to the support 32. Accordingly, the fine adjustment element 40 is configured for a slower and more precise advancement of the base 38, and therefore the pry members 39, towards the holder 70. In an embodiment, a central processor controls the actuator of the adjustment member 30 and the actuator 42 of the fine adjustment element 40. In another embodiment, one or more of the adjustment member and the fine adjustment element 40 are manually operated by a user. The shaft 46 may be pivotally coupled to the base 38 to provide for additional adjustability and accommodation of motor housings 80 of various sizes.

Figure 3:
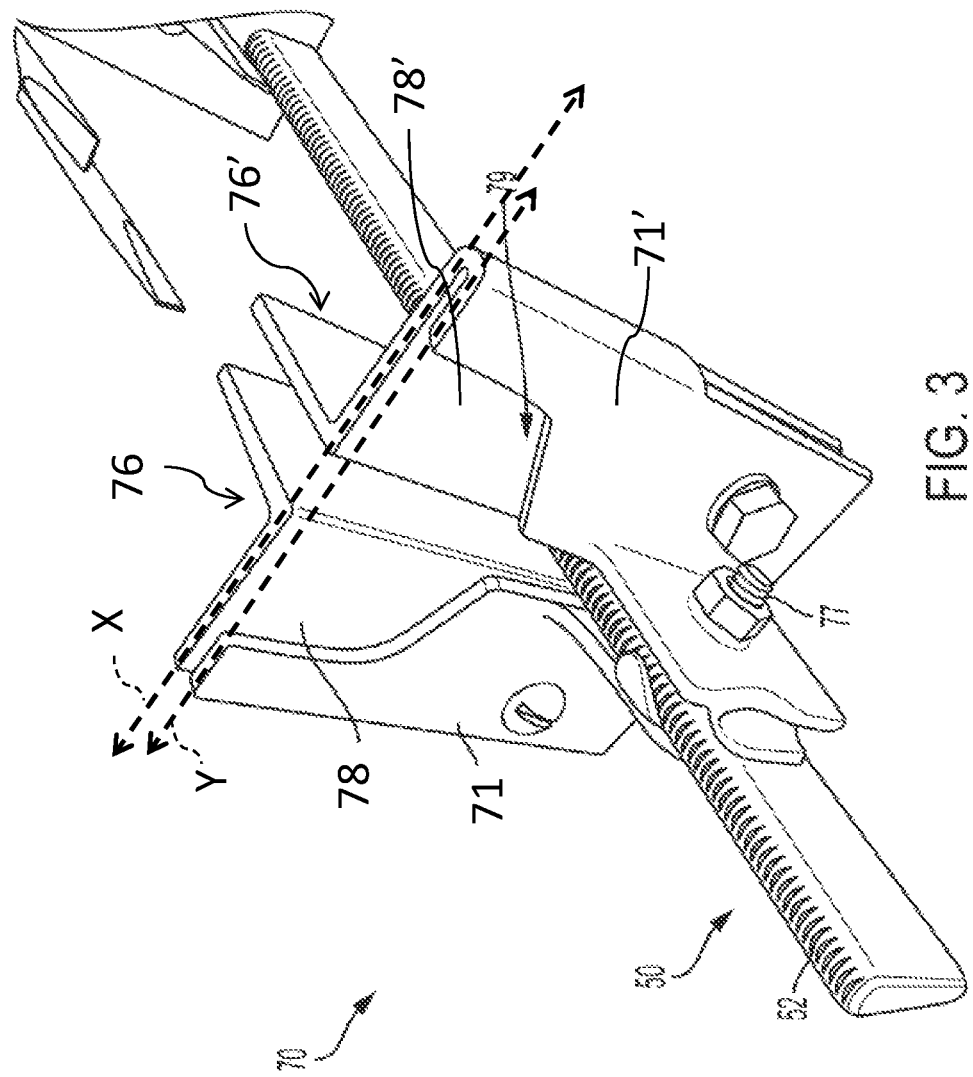
FIG. 3 illustrates a top perspective view of an embodiment of the motor housing removal assembly of FIG. 3.

Turning now to FIG. 3, the holder 70 is positioned at an opposing end of the track 50 from the adjustable end 20 of the motor housing removal assembly 10. As shown, the holder 70 is fixed to the track 50 and, accordingly, cannot move relative to the track 50. The holder 70 generally comprises a mount 72 configured to couple to and secure the folding power mirror motor housing 80 (FIGS. 4-11). The mount 72 comprises at least one base piece 76 coupled to the track 50 and defining at least one first plate surface 78 and an opposing second plate surface 71. In the embodiment shown in FIGS. 1-11 and specifically in FIGS. 1, 3, and 8 the mount 72 comprises two base pieces 76, 76' with each comprising a first plate surface 78, 78', and second plate surfaces 71, 71' oppose the first plate surfaces. The first plate surface 78, 78' extends along a first plane X and the second plate surface 71, 71' extends along a second plane Y. As shown in FIG. 3, the first plane X is parallel to the second plane Y, however in other embodiments, the first plane X may not be parallel to the second plane Y. A gap 79 is defined between the first plate surface 78, 78' and the second plate surface 71, 71' of the mount 72. to define a pocket or gap 79. As shown, in FIGS. 1-11, the base piece 76, first surface 78, and second surface 71 are formed as a single unitary component. In another embodiment, the first surface 78 and the second surface 71 are separate components and one or both may be moved relative to the other. In another embodiment, the mount 72 may comprise a single unitary component or multiple components movably fastened together or fixedly fastened together. The holder 70 may further comprise a track engagement portion 74 that is configured to secure the holder 70 to the track 50 such that it cannot be moved relative to the track 50. As shown, one or more fasteners 77 may be used to fixedly couple the track engagement portion 74 of the holder 70 to the track 50. In an embodiment, the track 50 and the holder 70 may be formed as a single unitary component.

Figure 5:
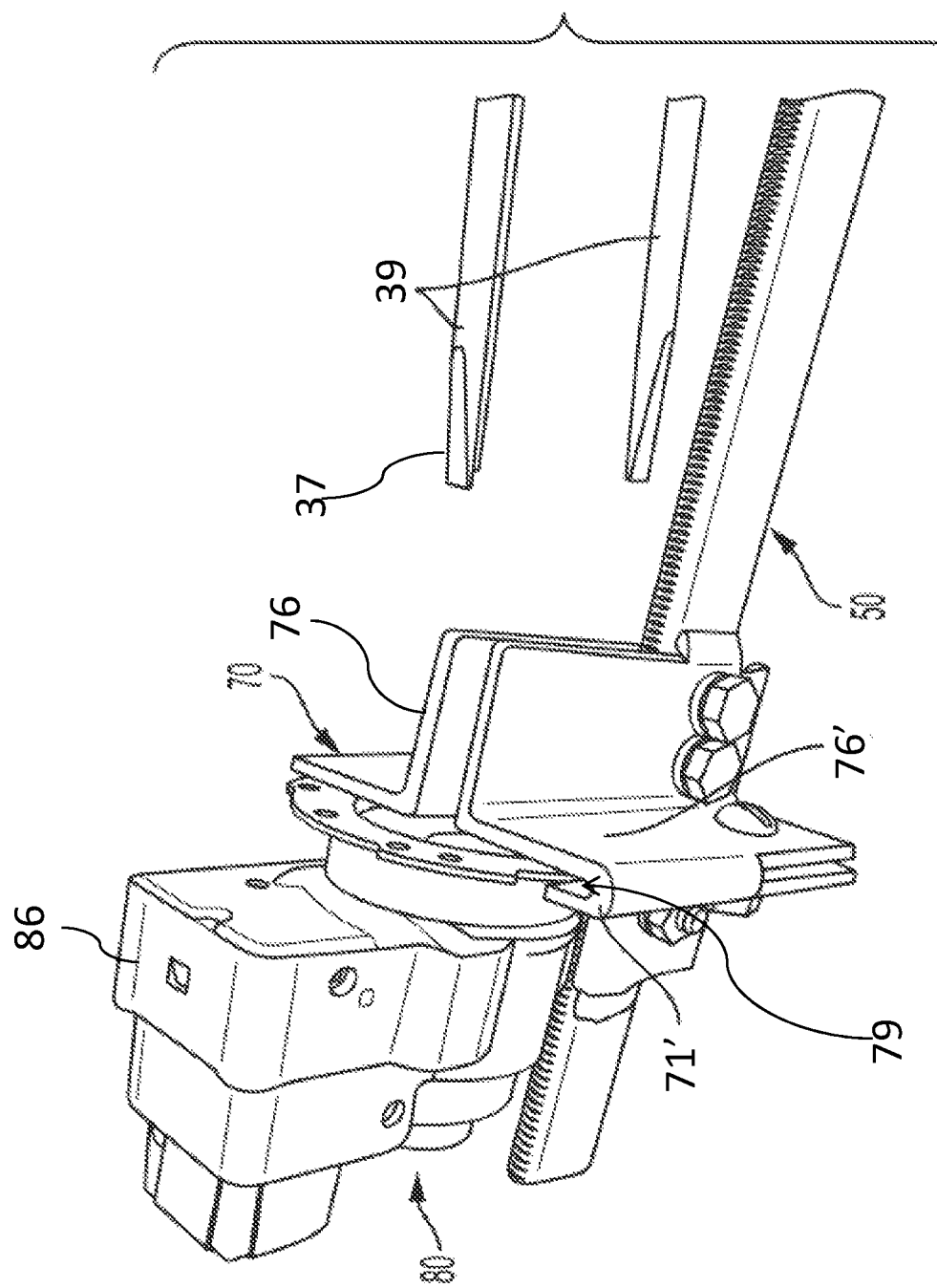
FIG. 5 illustrates a top perspective view of an embodiment of the holder of the motor housing removal assembly of FIG. 3 holding a motor surrounded by a motor housing.
Figure 6:
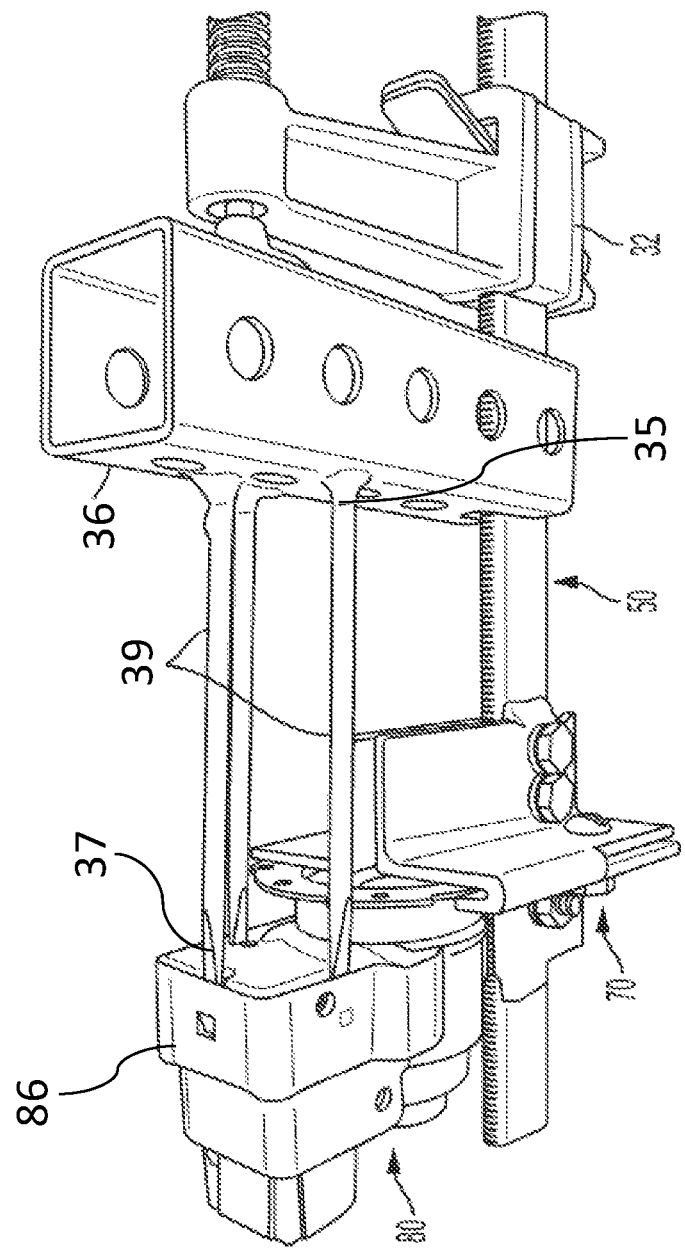
FIG. 6 illustrates a top perspective view of the embodiment of the adjustment member of the motor housing removal assembly of FIG. 5 in contact with the motor housing.
Figure 7:
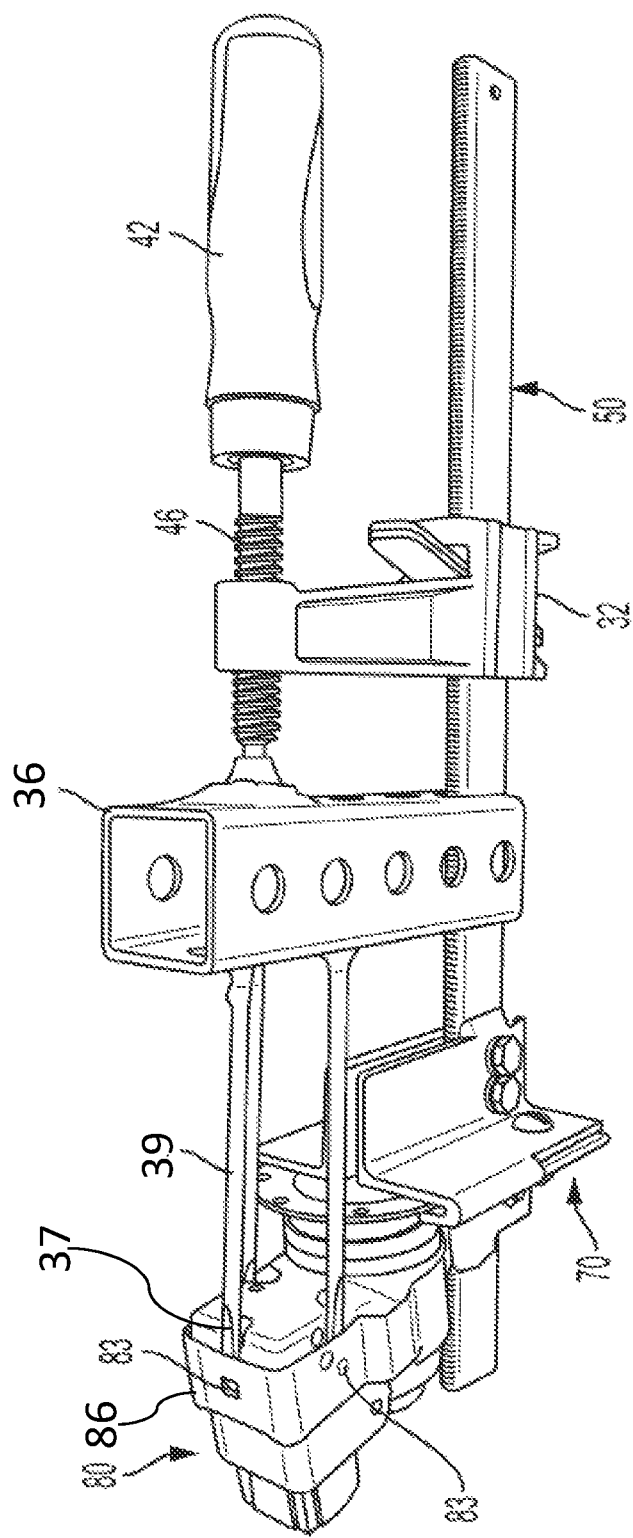
FIG. 7 illustrates a top perspective view of the adjustment member of the motor housing removal assembly of FIG. 6 in a first position removing the motor housing from the motor.

Referring to FIGS. 5-11, in order to remove a folding power mirror motor housing 80 from the folding mirror motor 82 using the motor housing removal assembly 10, the motor 82 surrounded by a motor housing 80 is positioned within the mount 72 such that the edges of the folding power mirror motor housing 80 or another part of the housing 80 or motor 82 is retained within the gap 79 as shown in FIG. 5. Once secured, the engagement element 34 is moved to an unlocked position to allow the support 32 of the adjustment member 30 to move relative to the track 50 toward the mount 72 as is shown in FIG. 6. The adjustment member 30 is used to position the second ends 37 of each of the plurality of pry elements 39 proximate or in contact with the folding power mirror motor housing 80. Referring to FIGS. 6-7, the plurality of pry elements 39 are positioned on the base 38 such that they engage at least three sides of the folding power mirror motor housing 80.

As shown, the motor housing 80 may comprise a first portion 84 and a second portion 86 that are frictionally connected with the aid of one or more pre-manufactured notches 83 or detent structures. The second ends 37 of the pry elements are configured to align with the notches 83. In an embodiment, the positioning of the pry elements 39 may be adjusted relative to the base 38 in order to accommodate different sizes or configurations of motor housings 80. In an embodiment without a fine adjustment element 40, the support 32 is continued to be advanced relative to the track 50 such that the second ends 37 of the pry elements 39 lodge between the first portion 84 and the second portion 86 of the motor housing 80. Facts to further advancement of the support 32 acts to urge the separation of the second portion 86 from the first portion 84 to expose the motor 82 for repairing.

Figure 8:
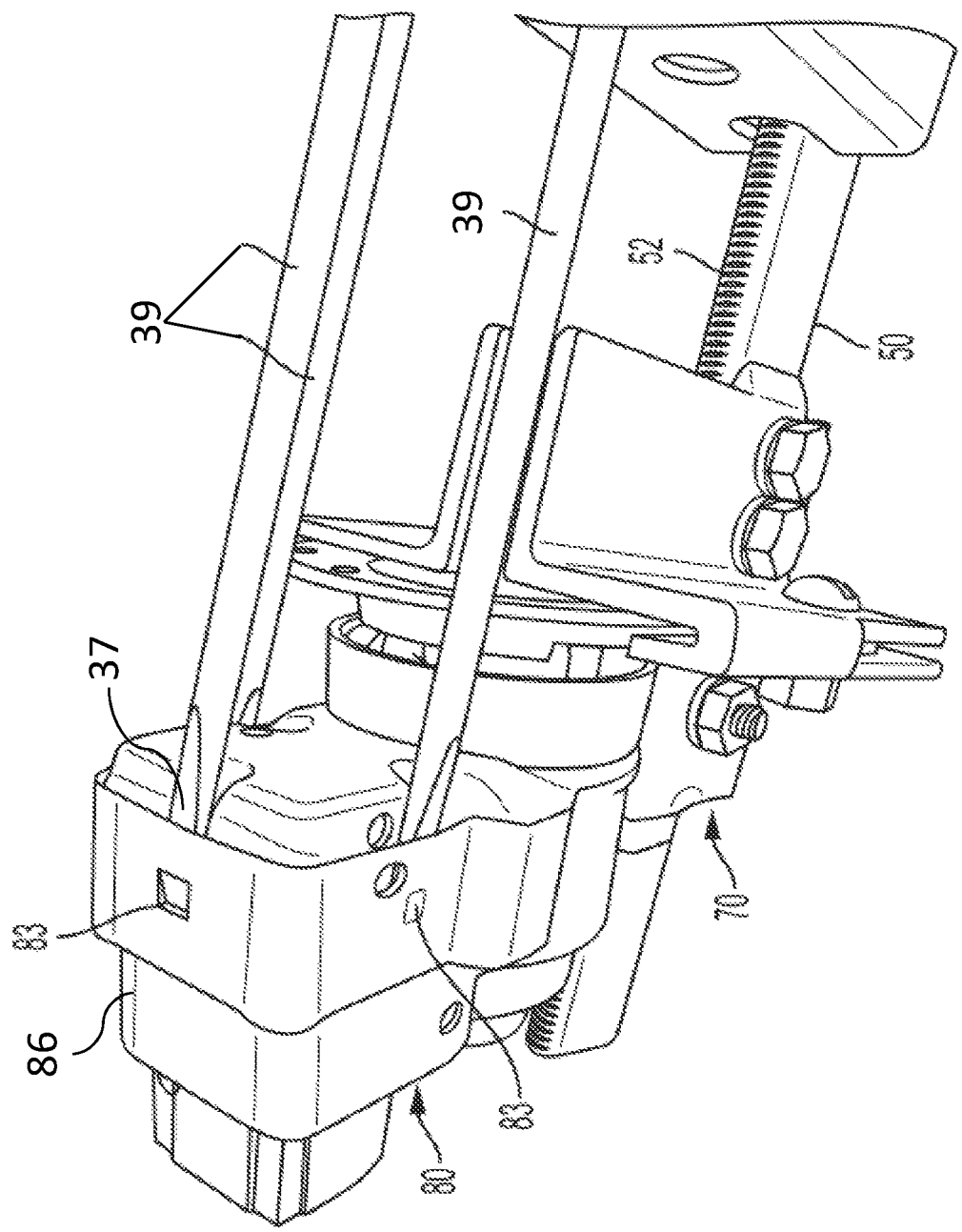
FIG. 8 illustrates a close-up view of a portion of the adjustment member of the motor housing removal assembly of FIG. 7.

In the embodiments shown in FIGS. 7-8, a fine adjustment element 40 is provided. In these embodiments, the handle 42 or actuator of the fine adjustment element 40 may then be manipulated to slowly drive the base 38 towards the mount, thereby causing the second ends 37 of each of the plurality of projections 39 to wedge or pry between the two portions 84, 86 of the folding power mirror motor housing 80 at the pre-manufactured notches 83 or detent structures. In the embodiment shown in FIGS. 7-8, the shaft 46 of the fine adjustment may have a plurality of grooves in a corkscrew pattern that are configured to engage complimentary features within the first opening (not shown) of the support 32. As such, rotation of the handle 42 in one direction acts to slowly drive fine adjustment element 40, which slowly advances the pry elements 39 toward the mount 72 of the holder 70. In contrast, rotation of the handle 42 in the opposite direction acts to drive the fine adjustment 40 in an opposite direction to move the pry elements 39 away from the mount 72 of the holder 70.

Figure 9:
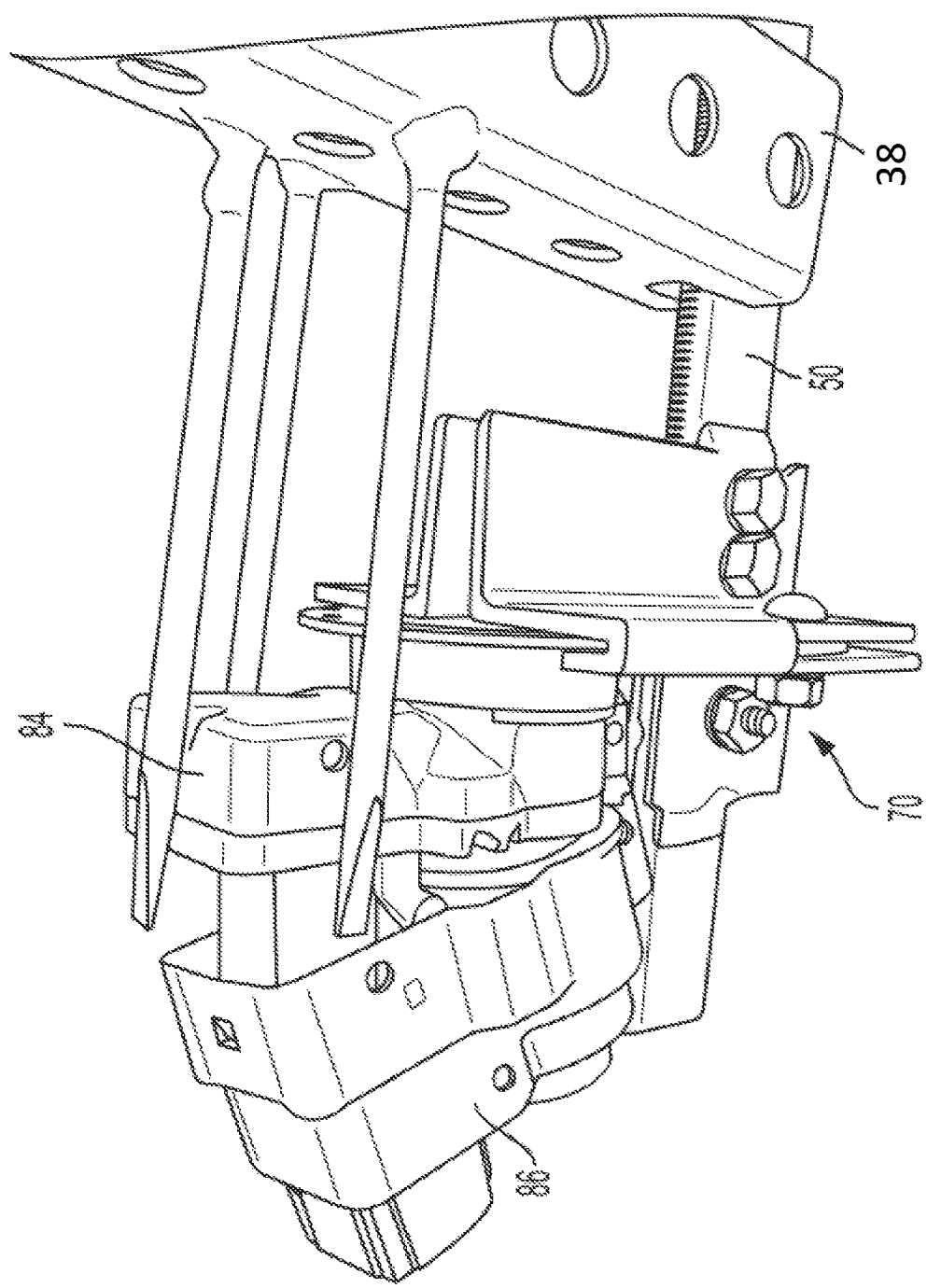
FIG. 9 illustrates a close-up view of the portion of the adjustment member of the motor housing removal assembly of FIG. 8 with the adjustment member in a second position removing the motor housing from the motor.
Figure 10:
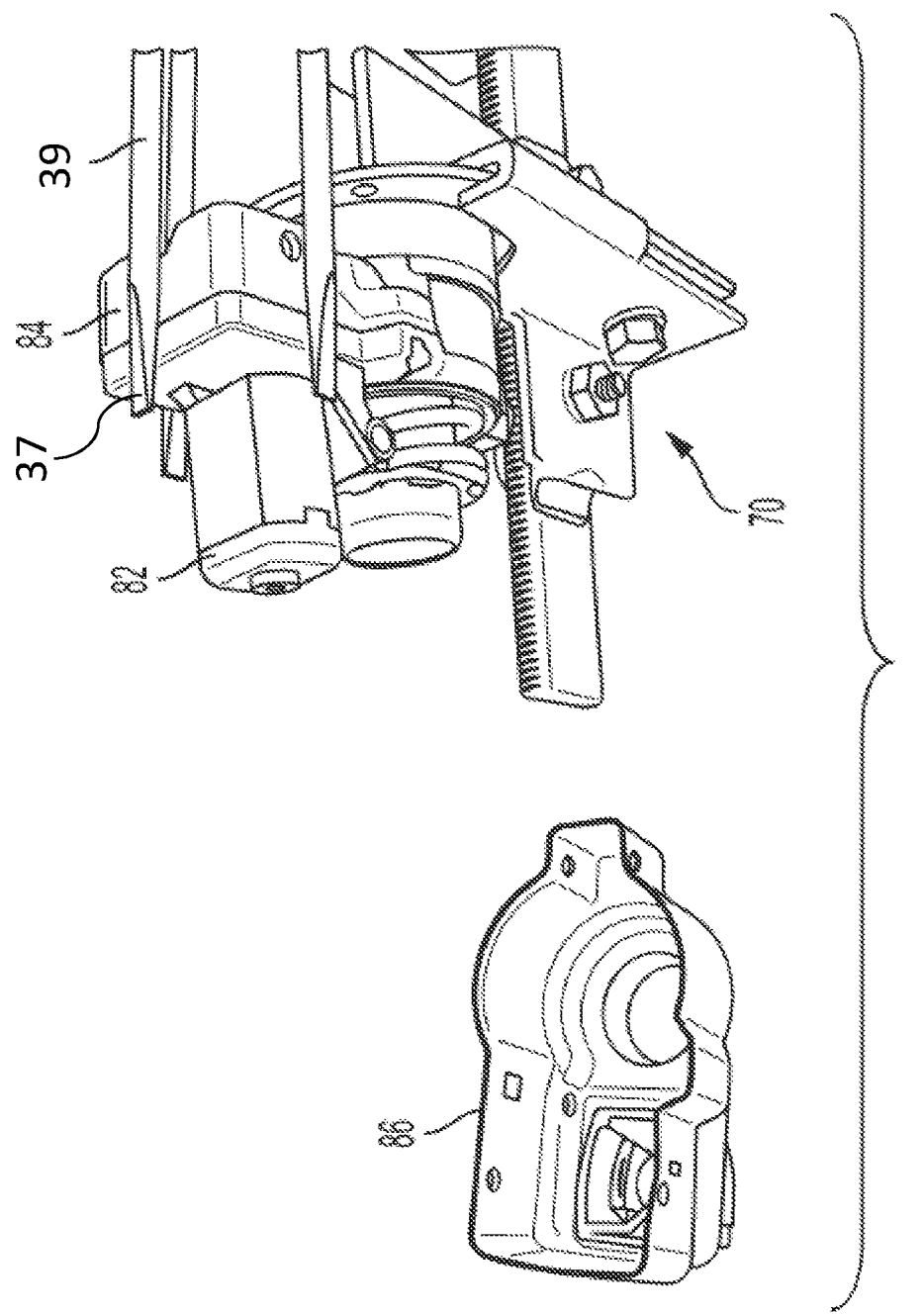
FIG. 10 illustrates a close-up view of the portion of the adjustment member of the motor housing removal assembly of FIG. 9 with the motor housing removed.
Figure 11:
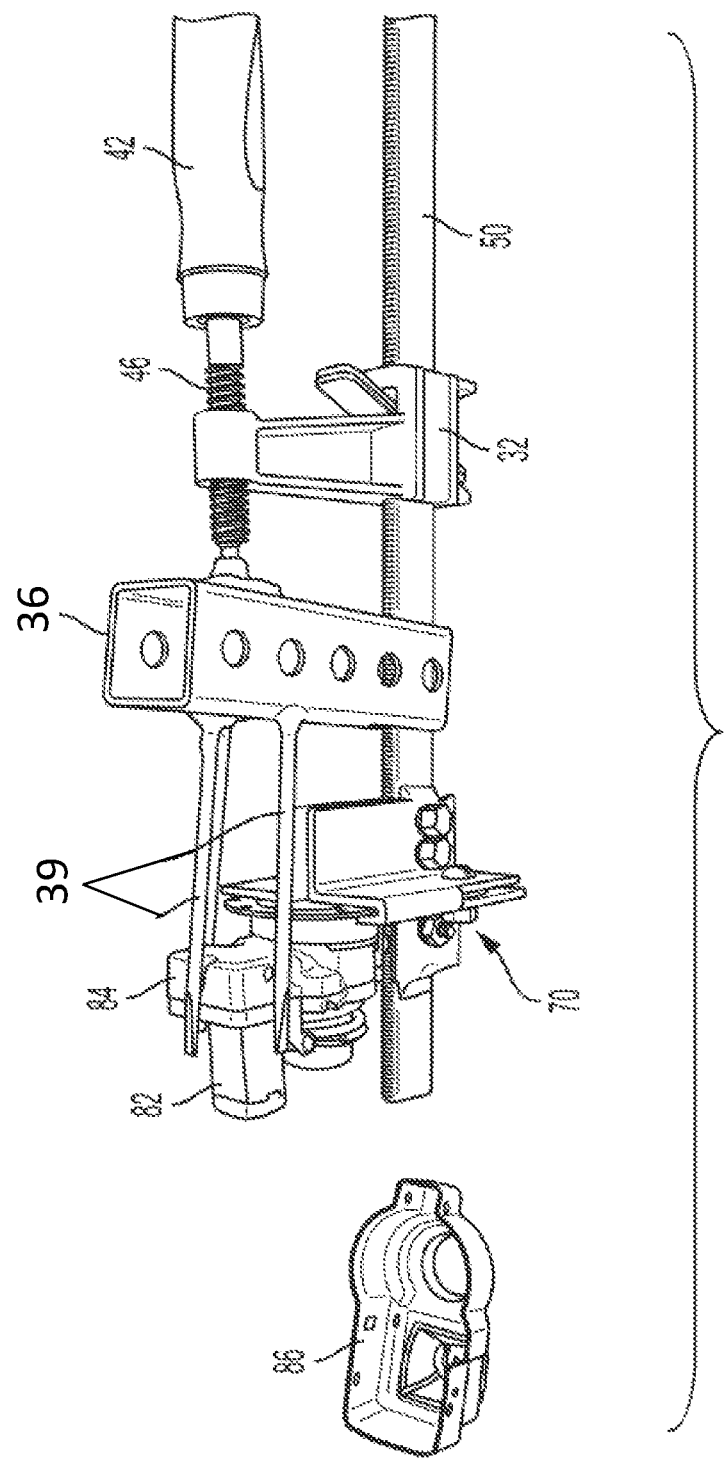
FIG. 11 illustrates a top perspective view of the motor housing removal assembly of FIG. 10 with the motor housing removed from the motor.

Referring to FIGS. 9-11, as the base 38 and the plurality of pry elements 39 are driven toward the mount 72, the plurality of pry elements 39 lift, pry, or otherwise separate the first portion 84 of the folding power mirror motor housing 80 away from the second portion 86 such that the detents or notches 83 of the first portion 84 can be disengaged from the second portion 86. The folding power mirror motor housing 80 may comprise more detents or notches 83 than pry elements 39 that are coupled to the base 38. In such cases, the remaining detents or notches 83 may be disengaged using a hammer or mallet once the plurality of pry elements 39 disengages their corresponding detents or notches 83. Once the folding power mirror motor housing 80 is opened (i.e., the first portion 84 is removed from the second portion 86), the motor 82 can be accessed and repaired.

Figure 12:
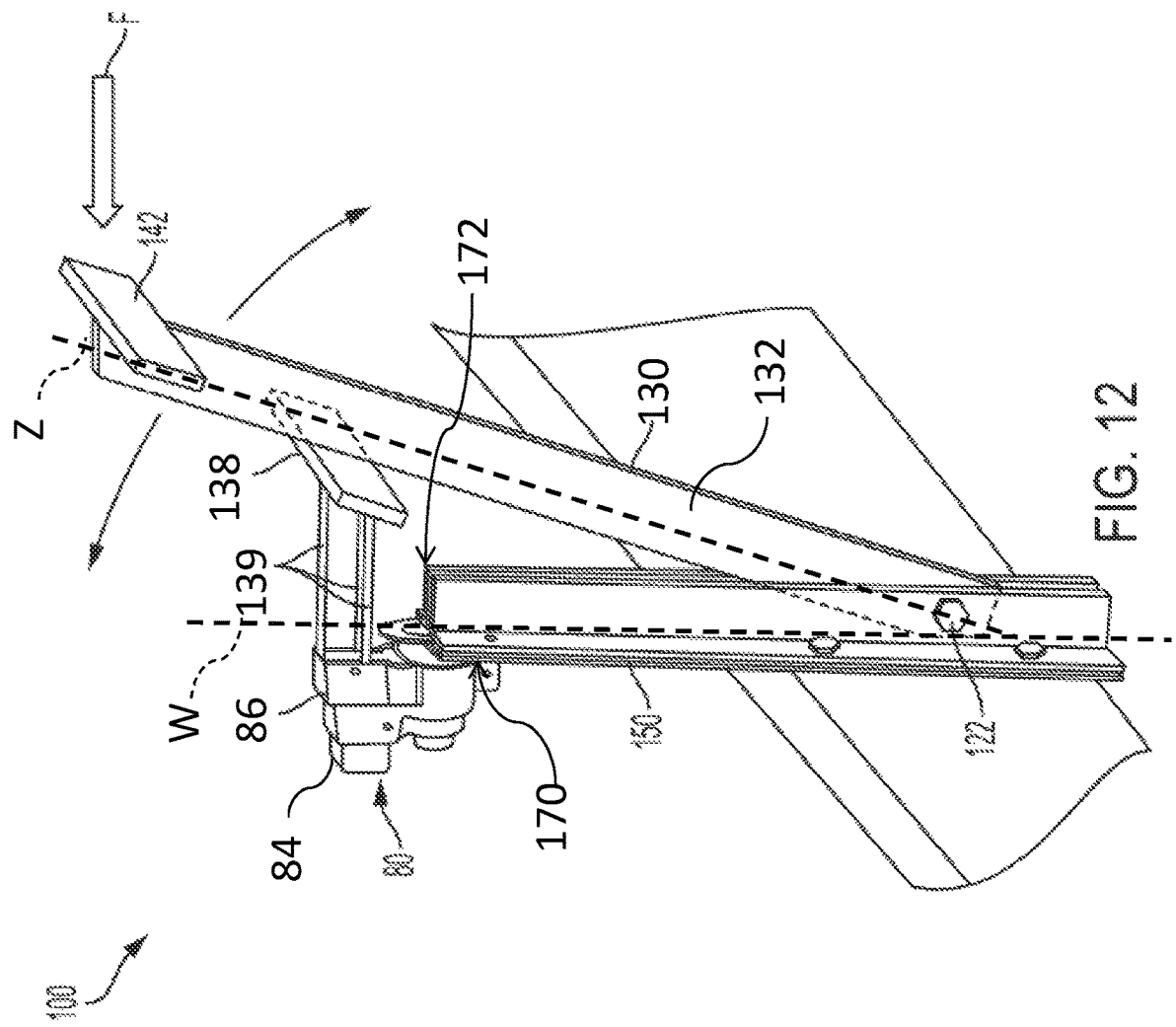
FIG. 12 illustrates a side perspective view of another embodiment of the motor housing removal assembly with a motor surrounded by a housing secured in a holder.

Referring to FIG. 12, another embodiment of the housing removal assembly 100 may be configured to be coupled to a table, bench, or other such fixture. As shown, a lever or adjustment member 130 comprises a support 132 that extends along an axis Z and is coupled to a handle or actuator 142 at one end and pivotally coupled to an extension or track 150 at an opposite end using a hinge 122, bolt, or other such coupler. The track 150 extends along an axis W and the support 132 is configured to move relative to the track 150 such that the axis Z of the support may intersect the axis W of the track at a first positon and may be parallel or extend along the same axis as that of the track 150 in a second position. The second position being the position when the first housing portion 84 is removed from the motor. The actuator 142 may be manually operated or operated using an electric motor, a pneumatic assembly, a hydraulic assembly, or any combination thereof. A base 138 is coupled to the adjustment member 130 on a first side and to a plurality of projections or pry elements 139 on an opposing second side. Each of the plurality of pry elements 139 comprises a first end coupled to the base 138 and comprising a first thickness and a second end comprising a second thickness where the first thickness is greater than the second thickness. As shown, the pry elements 139 may be similar to those in previously described embodiments. A holder 170 is fixedly coupled to the extension 150 opposite the end coupled to the adjustment member 130. As shown, the holder 170 may generally comprises similar components to the holder 70 illustrated in FIGS. 1-11 and the power folding mirror housing 80 is secured in the mount 172 in a similar fashion as was previously described.

The embodiment of FIG. 12 uses the pivoting movement of the adjustment member 130 about the hinge 122 to bring the second ends of the plurality of pry elements 139 into contact with the power folding mirror housing 80. Additional pressure applied along F acts to drive the plurality of projections 139 in order to dislodge the corresponding detents or notches 83 and allowing the first portion of the housing 84 to be separated from the second portion of the housing 86.

In an embodiment, a separate fine adjustment element may be included to drive the base 138 in relation to the adjustment member 130. In a further embodiment, the plurality of pry elements 139 may be configured to have their position adjusted relative to the base 138.

One or more of the components of the embodiments of the motor housing removal assembly 10, 100 may be comprised of plastic, metal, a resin, or any other suitable durable material or combinations thereof.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. A motor housing removal assembly comprising:
a track defining a plurality of surface features on at least one side;
an adjustment member comprising,
a support configured to move along the track,
an engagement element pivotally coupled to the support and configured to pivot to engage one or more of the plurality of surface features of the track to define a locked position where the support is inhibited from moving relative to the track,
a base moveably coupled to the support, and
a plurality of pry members each comprising a first end coupled to the base, wherein the first end of each of the plurality of pry members comprises a first thickness, and a second end opposing the first end and comprising a second thickness, wherein the first thickness is greater than the second thickness; and
a holder fixedly coupled to an end of the track and comprising,
a first surface extending along a first plane, and
a second surface spaced apart from the first surface and extending along a second plane, wherein a gap is defined between the first and second surfaces configured to hold at least a portion of a motor housing,
wherein movement of the support in a first direction relative to the holder is configured to move the plurality of pry members toward the holder, and
wherein movement of the support in a second direction relative to the holder is configured to move the plurality of pry members away from the holder.

2. The motor housing removal assembly of claim 1, wherein the plurality of pry members are configured to move relative to the base.

3. The motor housing removal assembly of claim 1, wherein the holder and the track are formed as a single unitary component.

4. The motor housing removal assembly of claim 1, wherein the engagement element is spring-loaded.

5. The motor housing removal assembly of claim 1, further comprising an actuator coupled to the support and a driver shaft, configured to move the support relative to the track.

6. A motor housing removal assembly comprising:
an extension defining a plurality of surface features on at least one side;
an adjustment member comprising,
a support configured to couple to and move relative to the extension,
an engagement element moveably coupled to the support and configured to engage the extension to define a locked position preventing the support from moving relative to the extension,
a base coupled to the support, and
a plurality of pry members each comprising a first end coupled to the base and comprising a first thickness and a second end opposing the first end and comprising a second thickness, wherein the first thickness is greater than the second thickness; and
a holder fixedly coupled to an end of the extension and configured to hold at least a portion of a motor housing,
wherein movement of the support in a first direction relative to the holder is configured to move the plurality of pry members toward the holder, and
wherein movement of the support in a second direction relative to the holder is configured to move the plurality of pry members away from the holder.

7. The motor housing removal assembly of claim 6, further comprising
an actuator coupled to the support and a driver shaft, configured to move the support relative to the extension.

8. The motor housing removal assembly of claim 6, further comprising a fine adjustment element comprising an actuator and a driver shaft is coupled to the actuator at one end and to the base at an opposing end, wherein movement of the actuator is configured to move the base relative to the support.

9. The motor housing removal assembly of claim 6, where the holder further comprises:
a first surface extending along a first plane, and
a second surface spaced apart from the first surface and extending along a second plane,
wherein a gap is defined between the first and second surfaces configured to hold at least a portion of a motor housing.

10. The motor housing removal assembly of claim 6, wherein the plurality of pry members are configured to move relative to the base.

11. The motor housing removal assembly of claim 6, wherein the holder and the extension are formed as a single unitary component.

12. The motor housing removal assembly of claim 6, wherein the engagement element is spring-loaded.

13. The motor housing removal assembly of claim 1, further comprising a fine adjustment element including an actuator and a driver shaft coupled to the actuator at one end and to the base at an opposing end, wherein movement of the actuator along with the driver shaft moves the plurality of pry members relative to the support.

14. The motor housing removal assembly of claim 1, wherein the first plane is parallel to the second plane.

15. A motor housing removal assembly comprising:
- an extension defining a plurality of surface features on at least one side;
- an adjustment member comprising,
  - a support moveably engaged to the extension and configured to move relative to the extension,
  - a base coupled to the support, and
  - a plurality of pry members each comprising a first end coupled to the base and comprising a first thickness and a second end opposing the first end and comprising a second thickness, wherein the first thickness is greater than the second thickness; and
- a holder fixedly coupled to an end of the extension and configured to hold at least a portion of a motor housing,
  - wherein movement of the support in a first direction relative to the holder is configured to move the plurality of pry members toward the holder, and
  - wherein movement of the support in a second direction relative to the holder is configured to move the plurality of pry members away from the holder.

\* \* \* \* \*